United States Patent
Schröder-Frerkes

(10) Patent No.: US 7,722,730 B2
(45) Date of Patent: May 25, 2010

(54) METHOD AND DEVICE FOR HEAT-SEALING WINDOWS INTO FOLDING CARTON BLANKS

(76) Inventor: Julius Schröder-Frerkes, Trills 110, 40699 Erkrath (DE)

( * ) Notice: Subject to any disclaimer, the term of this patent is extended or adjusted under 35 U.S.C. 154(b) by 293 days.

(21) Appl. No.: 11/815,417

(22) PCT Filed: Jan. 31, 2006

(86) PCT No.: PCT/EP2006/000790

§ 371 (c)(1),
(2), (4) Date: Aug. 2, 2007

(87) PCT Pub. No.: WO2006/082012

PCT Pub. Date: Aug. 10, 2006

(65) Prior Publication Data

US 2008/0149278 A1    Jun. 26, 2008

(30) Foreign Application Priority Data

Feb. 3, 2005    (DE) .................. 10 2005 005 215

(51) Int. Cl.
*B29C 65/02* (2006.01)

(52) U.S. Cl. .................. 156/64; 156/108; 156/275.1; 156/350; 156/351; 156/358; 156/378; 156/379; 156/379.8; 156/538; 156/539; 156/582; 156/583.1; 53/463; 53/477; 53/484; 53/485; 53/389.5; 53/329.2; 53/371.5; 53/374.5; 53/389.4

(58) Field of Classification Search .................. 156/64, 156/108, 275.1, 350, 351, 358, 378, 379, 156/379.8, 379.9, 538, 539, 582, 583.1; 53/463, 53/477, 484, 485, 329.2, 371.5, 374.5, 389.4, 53/389.5
See application file for complete search history.

(56) References Cited

U.S. PATENT DOCUMENTS

| 2,680,471 A | 6/1954 | Mercer |
| 3,684,081 A * | 8/1972 | Matsuo .................. 198/811 |

(Continued)

FOREIGN PATENT DOCUMENTS

DE    2362613    6/1975

(Continued)

*Primary Examiner*—Kat Wyrozebski
*Assistant Examiner*—Joshel Rivera
(74) *Attorney, Agent, or Firm*—Greer, Burns, Crain Ltd

(57) ABSTRACT

The invention relates to a method and device for heat-sealing windows into folding carton blanks for producing liquid-proof folding cartons having film windows. Pieces of film that are cut to measure are placed on the window openings of the folding carton blanks and the edges of the pieces of film are heat-sealed with the folding carton blanks so as to be liquid-proof using heated pressure segments or heat-sealing dies. The folding carton blanks, together with the pieces of film, are fed to a tail pulley for a transport belt by means of the transport belt and are inserted in the gap between the tail pulley and the transport belt resting thereon. In this gap, the blanks and pieces of film are continuously heat-sealed together by means of at least two heated pressure segments that are disposed on the outer periphery of the tail pulley and push radially from inwards against the transport belt in the area of deflection of the transport belt and thus onto the edges of the pieces of film.

16 Claims, 1 Drawing Sheet

U.S. PATENT DOCUMENTS 3,833,446 A      9/1974   Class
3,896,638 A *    7/1975   Gottschall et al. ............. 66/219
4,331,866 A *    5/1982   Batzdorff ............... 250/231.18

FOREIGN PATENT DOCUMENTS

| | | |
|---|---|---|
| DE | 7340444 | 7/1975 |
| DE | 3129496 | 2/1983 |
| DE | 19734578 | 2/1999 |
| DE | 10144744 | 4/2003 |
| EP | 1 201 417 | 5/2002 |
| JP | 54146185 | 11/1979 |

\* cited by examiner

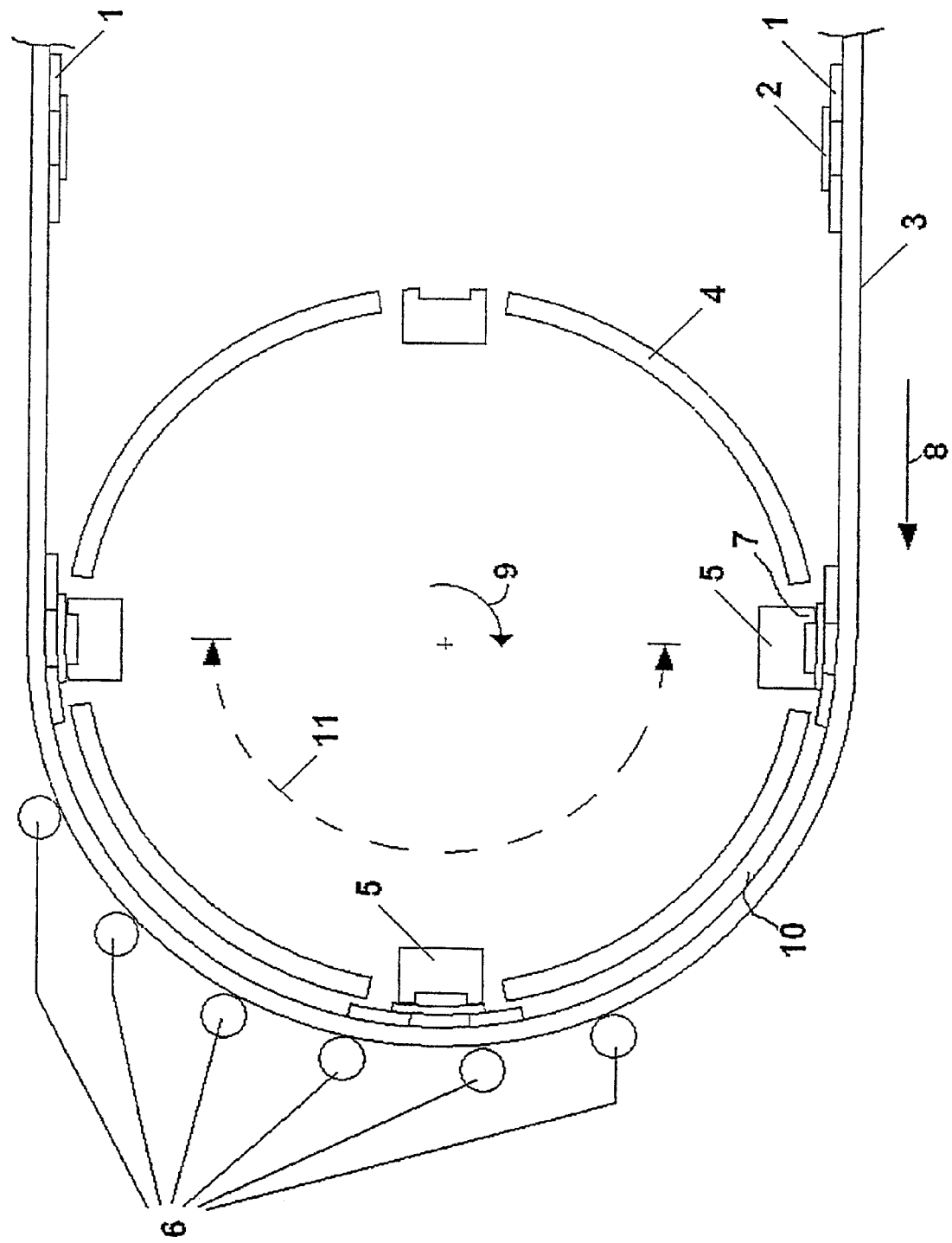

METHOD AND DEVICE FOR HEAT-SEALING WINDOWS INTO FOLDING CARTON BLANKS

BACKGROUND OF THE INVENTION

The present invention relates to a method and a device for heat-sealing windows into folding carton blanks in order to produce liquid-proof folding cartons having film windows, film pieces that have been cut to measure being placed onto the window openings of the folding carton blanks and the edges of the film pieces being heat-sealed to the folding carton blanks in a liquid-proof manner using heated pressure segments or heat-sealing dies.

The production of folding cartons having film windows, in which film pieces are placed onto the window openings of the folding carton blanks and are fastened there, is known in various methods. For example, in De-A-31 29 496 a method is described for the continuous production of folding cartons having film windows in which a piece of film made of flexible plastic material is glued over the window opening area. Here, the film is drawn from a supply roll, cut into pieces, and glued over the pre-stamped window opening area with as precise a fit as possible.

In EP-A-1 201 417, a method is described for multi-web production of folding carton blanks having glued-on film pieces, in which block cylinders are used to apply adhesive to the window opening area of the folding carton blanks at a gluing station, and film pieces are placed onto the adhesive-coated areas using a suction cylinder. A suction belt is used to transport the folding carton blanks. If a folding carton blank is missing, the suction belt is contaminated with glue and the following folding carton blank is undesirably contaminated with glue. It is therefore necessary either to raise the entire block cylinder or to lower the suction belt. In order to avoid contamination of the following folding carton blanks given a relatively high production rate with multi-web transport, in the area of the block cylinders the suction belts are supported in such a way that only defined sub-areas of the relevant suction belt need be removed from the area of contact with the block cylinder.

In order to produce liquid-proof folding cartons having windows with a tight heat-sealing of the film window to the liquid-proof surface of the folding carton, a method is known that uses heated stamps to heat-seal the film window to the folding carton. Here, the film material is first drawn mechanically from a roller, cut to length, and placed onto the window opening of the folding carton blanks, which are laid flat. The folding carton blank is moved on a transport belt above which a heated stamp is situated that is lowered onto the film window with pressure, and is transported during the heat-sealing process with the same speed as the transport belt. After the heat-sealing is completed, the stamp moves upward and is moved back to its initial position, opposite the direction of transport of the transport belt. In order to increase efficiency, it is possible to simultaneously operate a plurality of stamps in a repetitive method; here efficiency is limited by the fact that, due to the nature of the process, the time during which the stamp is moved back to its initial position cannot be used for heat-sealing.

SUMMARY OF THE INVENTION

On the basis of this prior art, the object of the present invention is to indicate a method and a device that enable the continuous production of liquid-proof folding cartons having film windows using heat-sealing, in the simplest and most economical manner possible.

In order to solve this problem, the present invention proposes that the folding carton blanks, together with the pieces of film are fed, by means of a transport belt, to a tail pulley for the transport belt, and are brought into the gap between the tail pulley and the transport belt resting thereon, and are continuously heat-sealed using at least two heated pressure segments that are situated on the outer periphery of the tail pulley and that press radially from inward against the transport belt in the area of deflection of the transport belt, thus pressing on the edges of the pieces of film.

Here, the diameter of the tail pulley is selected to be large enough that the length of the area of deflection of the transport belt provides the temporal dwell time that the heat-sealing process requires of the pressure segments on the film pieces in the gap between the transport belt and the tail pulley.

So that the folding carton blanks are securely guided in their transport and do not fall downward too early after the deflection of the transport belt, according to an embodiment of the present invention they are fixed to the transport belt using suitable means, for example suction devices. For this purpose, the transport belt can be fashioned as a suction belt corresponding to the present invention.

So that the folding carton blanks fixed locally on the transport belt can come into contact in a positionally precise fashion with the pressure segments in the gap between the tail pulley and the transport belt in the area of deflection of the transport belt, suitable devices, for example a measurement and regulating device that for example operates together with a light barrier, are used to synchronize the transport belt and the tail pulley with one another in such a way that the pressure edges of the pressure segments are pressed onto the edges of the film pieces with a precise fit.

In order to maintain a correspondingly high pressure between the transport belt and the pressure segments, and thus on the edges of the film pieces, in the area of deflection the transport belt is pressed against the tail pulley radially from outward by at least two support rollers, and thus is supported against the pressure segments.

BRIEF DESCRIPTION OF THE DRAWINGS

Further details and advantages of the present invention are explained in more detail in the following on the basis of an exemplary embodiment shown in a schematic FIGURE.

In the FIGURE, in the form of a section, a transport belt 3 is shown in a side view, whose transport direction (see directional arrow 8) is deflected in the opposite direction, from down to up, by a tail pulley 4 that rotates in direction of rotation 9 with the speed of transport belt 3. Here, transport belt 3 is partially wrapped around tail pulley 4, and the area of deflection 11 is approximately 180°. In the depicted exemplary embodiment, tail pulley 4 has on its outer periphery four heated pressure segments 5 that are disposed with a uniform spacing from one another.

On transport belt 3, there are situated folding carton blanks 1 with film pieces 2 put into place whose distance from one another corresponds to the distance between pressure segments 5. Through the movement of transport belt 3 in direction of transport 8 towards tail pulley 4, the folding carton blanks 1 are fed into gap 10 formed between tail pulley 4 and transport belt 3, and are drawn into this gap 10 by the transport of transport belt 3 and the rotation of tail pulley 4.

Differing from the representation in the FIGURE, of course gap 10 between transport belt 3 and pulley 4 collapses between the individual folding cartons 1.

A synchronization that is carried out by a measurement and regulating station (station not shown) ensures that folding carton blanks 1 are situated on transport belt 3 with respect to their spacing as well as their location in such a way that at the beginning of deflection area 11 of transport belt 3, each folding carton blank 1 comes into contact with one of the heated pressure segments 5 rotating with tail pulley 4, and with pressure edges 7 of these segments 5. The geometrical size and shape of the pressure edges 7 of the pressure segments 5 correspond to the size and shape of edges of the film pieces 2.

Folding carton blanks 1 with their film pieces 2 are now situated between transport belt 3 and pressure segments 5, or pressure edges 7 thereof, and remain in this position throughout the entire area of deflection 11. Due to the tension of transport belt 3, during the entire sojourn time of folding carton blanks 1 in gap 10 a radially acting force is maintained between pressure edges 7 and the edges of film pieces 2, causing these edges to be heat-sealed to folding carton blanks 1 in a liquid-proof manner. In order to support this pressure, preferably six support rollers 6 are situated outside transport belt 3 in area of deflection 11, and these rollers exert a radial counter-pressure on transport belt 3.

So that the folding carton blanks 1 do not change their position during their transport to tail pulley 4, and in particular so that after leaving tail pulley 4 they do not fall down prematurely from transport belt 3 (now situated at the top), the transport belt is fashioned with means (not shown) by which folding blank segments 1 are securely fixed at their location on or under transport belt 3, for example with suction devices.

The present invention is not limited to the exemplary embodiment shown in the FIGURE, but rather is variable in its application, for example with respect to the number of pressure segments on the outer periphery of the tail pulley, the length of the area of deflection of the transport belt and the position of the tail pulley, and the thereby executed change of direction of the transport belt from down to up in the depicted exemplary embodiment.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 folding carton blanks
2 film pieces
3 transport belt
4 tail pulley
5 pressure segments
6 support rollers
7 pressure edges of 5
8 direction of transport of 3
9 direction of rotation of 4
10 gap between 3 and 4
11 area of deflection of 3

The invention claimed is:

1. A method for heat-sealing windows into folding carton blanks in order to produce liquid-proof folding cartons having film windows comprising the steps:

placing the folding carton blanks onto a transport belt and locally fixing the folding carton blanks on the transport belt, placing film pieces that have been cut to measure onto window openings of the folding carton blanks and locally fixing the film pieces on the transport belt, arranging a tail pulley for the transport belt to deflect an area of the transport belt, thereby changing a direction of motion of the transport belt, introducing the folding carton blanks together with the film pieces into a gap between the tail pulley and the transport belt resting thereon, feeding the folding carton blanks and the film pieces through the change of direction of the transport belt by the tail pulley, and after the change of direction of the transport belt, suspending the folding carton blanks with the heat-sealed film pieces from a lower side of the transport belt, continuously heat sealing edges of the film pieces in a liquid-proof manner to the folding carton blanks using at least two heated pressure segments or heat-sealing dies with pressure edges, that are situated on an outer periphery of the tail pulley by pressing the at least two heated pressure segments or heat-sealing dies radially from inward against the transport belt in the area of deflection of the transport belt, thus pressing on the edges of the pieces of film, using suitable devices to synchronize the transport belt with the tail pulley in such a way that the folding carton blanks locally fixed on the transport belt come into contact with the pressure segments or heat sealing dies in the gap between the tail pulley and the transport belt in the area of deflection of the transport belt, and so that pressure edges of the pressure segments are pressed onto the edges of the film pieces with a precise fit, and pressing the transport belt against the tail pulley radially inwardly with the aid of support rollers engaged with the transport belt in the area of deflection of the transport belt.

2. A device for heat-sealing windows into folding carton blanks in order to produce liquid-proof folding cartons having film windows, comprising a transport belt for transporting the folding carton blanks provided with film pieces put into place relative to the folding cartons, a tail pulley engaged by the transport belt for changing a direction of movement of the transport belt at an area of deflection, the transport belt having a sufficient length extending away from the tail pulley before and after the change of direction to accommodate the placing of the folding carton blanks on the transport belt before the change of direction and for transporting the folding carton blanks away from the tail pulley after the change of direction, securing devices arranged at the transport belt to locally fix the folding carton blanks and film pieces lying on the transport belt to the belt prior to the change of direction of the belt and for suspending the folding carton blanks and heat-sealed film pieces from a lower surface of the belt after the change of direction of the transport belt has taken place, at least two heated pressure segments having pressure edges, situated on an outer periphery of the tail pulley, a measurement and regulating device to synchronize the transport belt with the tail pulley in such a way that the pressure segments carried on the tail pulley are pressed with their pressure edges onto the film pieces in a positionally precise manner in the area of deflection of the transport belt, the diameter of the tail pulley being at least large enough that the area of deflection of the transport belt, where the transport belt is in contact with the tail pulley, provides the dwell time that the heat-sealing process requires of the pressure segments on the film pieces in the gap between the transport belt and the tail pulley so as to effect a liquid-proof seal, and at least two support rollers situated in the area of deflection of the transport belt that press the transport belt radially inwardly against the tail pulley.

3. The device according to claim 2, wherein a geometrical size and shape of the pressure edges of the pressure segments correspond to a size and shape of edges of the film pieces.

4. The device according to claim 2, wherein the securing devices at the transport belt comprise suction devices.

5. The method according to claim 1, wherein the step of placing the folding carton blanks on the transport belt comprises placing the folding carton blanks on an upper surface of the transport belt.

6. The method according to claim 1, wherein the step of pressing the transport belt against the tail pulley radially inwardly comprises pressing the transport belt against the tail pulley radially inwardly with the aid of a plurality of support rollers engaged with the transport belt at a plurality of angular positions in the area of deflection of the transport belt.

7. The method according to claim 1, wherein the step of arranging the tail pulley for the transport belt to deflect an area of the transport belt comprises arranging the tail pulley to rotate about a horizontal axis and arranging the transport belt to extend horizontally into engagement with the tail pulley at a lower position of the tail pulley and to extend horizontally away from engagement with the tail pulley at an upper position of the tail pulley and the step of introducing the folding carton blanks into the gap between the tail pulley and the transport belt comprises introducing the folding carton blanks into the gap at the lower position of the tail pulley.

8. The method according to claim 1, wherein the step of fixing the folding carton blanks on the transport belt comprises fixing the folding carton blanks with a suction device.

9. The method according to claim 1, wherein the step of suspending the folding carton blanks from a lower side of the transport belt comprises suspending the folding carton blanks with a suction device.

10. The method according to claim 1, wherein the step of using suitable devices to synchronize the transport belt with the tail pulley includes utilizing a light barrier.

11. The method according to claim 1, wherein the step of pressing the transport belt against the tail pulley comprises engaging support rollers against the transport belt in the area of deflection such that the support rollers are pressed in a radial direction towards an axis of rotation of the tail pulley.

12. The device according to claim 2, wherein the at least two support rollers are engaged with the transport belt at a plurality of angular positions in the area of deflection of the transport belt.

13. The device according to claim 2, wherein the tail pulley is arranged to rotate about a horizontal axis and the transport belt is arranged to extend horizontally into engagement with the tail pulley at a lower position of the tail pulley and to extend horizontally away from engagement with the tail pulley at an upper position of the tail pulley.

14. The device according to claim 2, wherein the measurement and regulating device includes a light barrier.

15. The device according to claim 2, wherein the support rollers are arranged in the area of deflection and are pressed in a radial direction towards an axis of rotation of the tail pulley.

16. The device according to claim 2, wherein the transport belt comprises a suction belt.

* * * * *